(12) United States Patent
Spaulding et al.

(10) Patent No.: US 8,820,924 B2
(45) Date of Patent: Sep. 2, 2014

(54) INVERSION MARKING FOR CONTACT LENSES

(75) Inventors: Russell T. Spaulding, St. Johns, FL (US); Nelson V. Tabirian, Winter Park, FL (US)

(73) Assignee: Johnson & Johnson Vision Care, Inc., Jacksonville, FL (US)

(*) Notice: Subject to any disclaimer, the term of this patent is extended or adjusted under 35 U.S.C. 154(b) by 0 days.

(21) Appl. No.: 13/562,902

(22) Filed: Jul. 31, 2012

(65) Prior Publication Data
US 2014/0036224 A1 Feb. 6, 2014

(51) Int. Cl.
*G02B 7/04* (2006.01)
*G02C 7/04* (2006.01)

(52) U.S. Cl.
CPC .................................. *G02C 7/049* (2013.01)
USPC ..................................................... 351/159.28

(58) Field of Classification Search
CPC ............................... G02C 7/022; G02C 7/049
USPC ............................ 351/159.02, 159.24, 159.28
See application file for complete search history.

(56) References Cited

U.S. PATENT DOCUMENTS

| 5,158,718 | A  | * | 10/1992 | Thakrar et al. ............... 264/1.36 |
| 6,042,230 | A  |   | 3/2000  | Neadle et al. |
| 6,811,259 | B2 | * | 11/2004 | Tucker ..................... 351/159.24 |
| 2004/0044099 | A1 |   | 3/2004  | Tucker et al. |
| 2012/0113384 | A1 | * | 5/2012  | Pasternak et al. .......... 351/159.3 |

FOREIGN PATENT DOCUMENTS

| EP | 0947872 B1 | 10/1999 |
| JP | 63163321 | 7/1988 |
| WO | WO 2011/010267 A1 | 1/2011 |

OTHER PUBLICATIONS

European Search Report for Application No. EP13178602 dated Oct. 15, 2013.

* cited by examiner

*Primary Examiner* — Darryl J Collins
(74) *Attorney, Agent, or Firm* — Carl J. Evens (57) ABSTRACT

An ophthalmic lens incorporating clearly identifiable, highly visible inversion marking(s) that become invisible when placed on the eye may be utilized to allow an individual to easily distinguish between the normal state of the lens and the inverted state of the lens. The ophthalmic lens comprises a thin material layer capable of changing its optical state from diffusive light scattering, colored, or both, to invisible transparent at the corneal temperature of a normal person, at the influence of ambient light, or a combination thereof.

14 Claims, 6 Drawing Sheets

INVERSION MARKING FOR CONTACT LENSES

BACKGROUND OF THE INVENTION

1. Field of the Invention

The present invention relates to ophthalmic lenses, and more particularly to contact lenses incorporating clearly identifiable, highly visible inversion marking(s) that become invisible when inserted or positioned on the eye.

2. Discussion of the Related Art

Myopia or nearsightedness is an optical or refractive defect of the eye wherein rays of light from an image focus to a point before they reach the retina. Myopia generally occurs because the eyeball or globe is too long or the cornea is too steep. A minus or negative powered spherical lens may be utilized to correct myopia. Hyperopia or farsightedness is an optical or refractive defect of the eye wherein rays of light from an image focus to a point after they reach or behind the retina. Hyperopia generally occurs because the eyeball or globe is too short or the cornea is too flat. A plus or positive powered spherical lens may be utilized to correct hyperopia. Astigmatism is an optical or refractive defect in which an individual's vision is blurred due to the inability of the eye to focus a point object into a focused image on the retina. Astigmatism is caused by an abnormal curvature of the cornea. A perfect cornea is spherical whereas in an individual with astigmatism, the cornea is not spherical. In other words, the cornea is actually more curved or steeper in one direction than another, thereby causing an image to be stretched out rather than focused to a point. A cylindrical lens rather than a spherical lens may be utilized to resolve astigmatism.

Contact lenses may be utilized to correct myopia, hyperopia, astigmatism as well as other visual acuity defects. Contact lenses may also be utilized to enhance the natural appearance of the wearer's eyes. Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses were made or fabricated from hard materials, were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Specifically, silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeabilities and are generally more comfortable to wear than the contact lenses made of the earlier hard materials.

Contact lenses need to be thin and flexible for wearer comfort. Such flexibility may result in contact lens inversion upon handling. Essentially, contact lens inversion occurs when the corneal or back curve side of the contact lens inverts and becomes the front curve side of the lens due to handling in some manner. Accordingly, if the contact lens is placed on the eye in an inverted state, the desired vision correction and comfort are not achieved. Thus, there is a need for marking the contact lenses such that their normal state may be easily distinguished from the inverted state. In order not to affect the aesthetic and optical properties of the contact lens, the currently utilized inversion marking is preferably made in the form of a small number series positioned at the periphery of the contact lens. This makes the marking barely visible thereby requiring special effort and adequate illumination to locate and identify it. Accordingly, there exists a need for an inversion marking, which may include multiple symbols and/or characters, which are highly visible and easily identifiable when the contact lens is out of the eye, but disappears or is optically invisible when placed on the eye.

SUMMARY OF THE INVENTION

The inversion marking for contact lenses in accordance with the present invention overcomes the disadvantages associated with the prior art as briefly set forth above.

In accordance with one exemplary embodiment, the present invention is directed to an ophthalmic lens. The lens comprises a contact lens formed from a first material and including at least an optic zone and a peripheral zone, and an inversion marking incorporated into the contact lens, the inversion marking comprising a second material configured to be visible when off the eye and invisible when on the eye.

In accordance with another exemplary embodiment, the present invention is directed to a lens. The lens comprises a first material, and a marking formed from a second material incorporated into the first material, the second material being configured to undergo a transformation between a visible state and an invisible state by the application of at least one of a temperature change, a light change or a humidity change.

Current inversion markings for contact lenses are poorly visible until the contact lens has become almost too dry to insert comfortably, and more importantly, the inversion markings are too small to be seen by individuals with vision problems. Accordingly, the present invention is directed to a contact lens comprising an inversion marking layer having a mark that is visible when the lens is off of or out of the eye and becomes invisible when the lens is on the eye. The optical properties of the inversion marking layer, which may include color, light scattering, light diffraction and light reflection, may be patterned, at least in parts, for easy and unambiguous identification of the normal and inverted states of the contact lens. It is important to note that any suitable pattern may be utilized and that the inversion marking layer, which is incorporated into the contact lens in any suitable location that does not interfere with the optics, may have different optical properties on opposite sides thereof. The transformation from a visible mark to an invisible mark may be induced via a number of factors or processes including by heat from the body to near cornea temperature, by ambient light, and changing humidity as when the contact lens is removed from a storage solution.

In the present invention such functionality may be achieved by utilizing the phase transition phenomena exhibited in liquid crystal materials. The liquid crystal state is a distinct phase of matter observed between the solid or crystalline state and the liquid or isotropic state. There is the nematic phase which is characterized by molecules that have no positional order, but tend to point in the same direction, the smectic phase in which the molecules demonstrate a degree of transitional order, the cholesteric or chiral nematic phase wherein there is alignment with respect to the molecules, but at a slight angle with respect to one another, and the columnar phase which is characterized by stacked columns of molecules. Particularly, nematic-isotropic or cholesteric-isotropic phase transition processes are employed to induce transformations between diffuse light scattering and transparent states in the case of nematic liquid crystal materials, and transformations from reflective to transparent states is the case of cholesteric liquid crystal materials. Utilizing liquid crystal materials in contact lenses for the purpose of creating markings offers a number of advantages, including very thin liquid crystal material layers may be utilized to obtain high contrast, the phase transition temperature of liquid crystal materials may be easily adjustable to match corneal temperature, liquid crystal materials provide a wide versatility of high contrast states, and liquid crystal materials are relatively inexpensive.

In one exemplary embodiment of the invention, the inversion marking layer comprises a layer of polymer dispersed liquid crystal material incorporated into the contact lens. In another exemplary embodiment of the invention, the inversion marking comprises a cholesteric liquid crystal material incorporated into the contact lens. Polymer dispersed liquid crystal technology provides the advantage of easy and inexpensive manufacturing, and viewing angle due to diffuse light scattering. Cholesteric liquid crystal technology has the advantage of mirror-like reflection that may be visible even at low light conditions, and the feasibility of different colors.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses were made or fabricated from hard materials, were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Specifically, silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeabilities and are generally more comfortable to wear than the contact lenses made of the earlier hard materials.

Currently available contact lenses remain a cost effective means for vision correction. The thin plastic lenses fit over the cornea of the eye to correct vision defects, including myopia or nearsightedness, hyperopia or farsightedness, astigmatism, i.e. asphericity in the cornea, and presbyopia i.e. the loss of the ability of the crystalline lens to accommodate. Contact lenses are available in a variety of forms and are made of a variety of materials to provide different functionality. Daily wear soft contact lenses are typically made from soft polymer materials combined with water for oxygen permeability. Daily wear soft contact lenses may be daily disposable or extended wear disposable. Daily disposable contact lenses are usually worn for a single day and then discarded, while extended wear disposable contact lenses are usually worn for a period of up to thirty days. Colored soft contact lenses use different materials to provide different functionality. For example, a visibility tint contact lens uses a light tint to aid the wearer in locating a dropped contact lens, enhancement tint contact lenses have a translucent tint that is meant to enhance one's natural eye color, the color tint contact lens comprises a darker, opaque tint meant to change one's eye color, and the light filtering tint contact lens functions to enhance certain colors while muting others. Rigid gas permeable hard contact lenses are made from siloxane-containing polymers but are more rigid than soft contact lenses and thus hold their shape and are more durable. Bifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

Contact lenses need to be thin and flexible for comfort. Such flexibility may result in contact lens inversion upon handling. Accordingly, there is a need for marking the contact lenses with some form of indicia such that their normal or non-inverted state may be easily distinguished from the inverted state. In order not to affect the aesthetic and optical properties of the contact lens, the inversion marking is presently made in the form of a small number series at the periphery of each contact lens. This makes the marking barely visible, thus requiring special effort and/or adequate illumination to locate and identify the marks. An inversion marking in accordance with the present invention that is highly visible and easily identifiable when the contact lens is out or off of the eye but is invisible on the eye is highly desirable.

In the present invention such functionality may be achieved by utilizing the phase transition phenomena exhibited in liquid crystal materials. The liquid crystal state is a distinct phase of matter observed between the solid or crystalline state and the liquid or isotropic state. There is the nematic phase which is characterized by molecules that have no positioned order, but tend to point in the same direction, the smectic phase in which the molecules demonstrate a degree of transitional order, the cholesteric or chiral nematic phase wherein there is alignment with respect to the molecules, but at a slight angle with respect to one another, and the columnar phase which is characterized by stacked columns of molecules. Particularly, nematic-isotropic or cholesteric-isotropic phase transition processes are employed to induce transformations between diffuse light scattering and transparent states in the case of nematic liquid crystal materials, and transformations from reflective to transparent states is the case of cholesteric liquid crystal materials. Utilizing liquid crystal materials in contact lenses for the purpose of creating markings offers a number of advantages, including very thin liquid crystal material layers may be utilized to obtain high contrast, the phase transition temperature of liquid crystal materials may be easily adjustable to match corneal temperature, liquid crystal materials provide a wide versatility of high contrast states, and liquid crystal materials are relatively inexpensive.

Figure 1A:
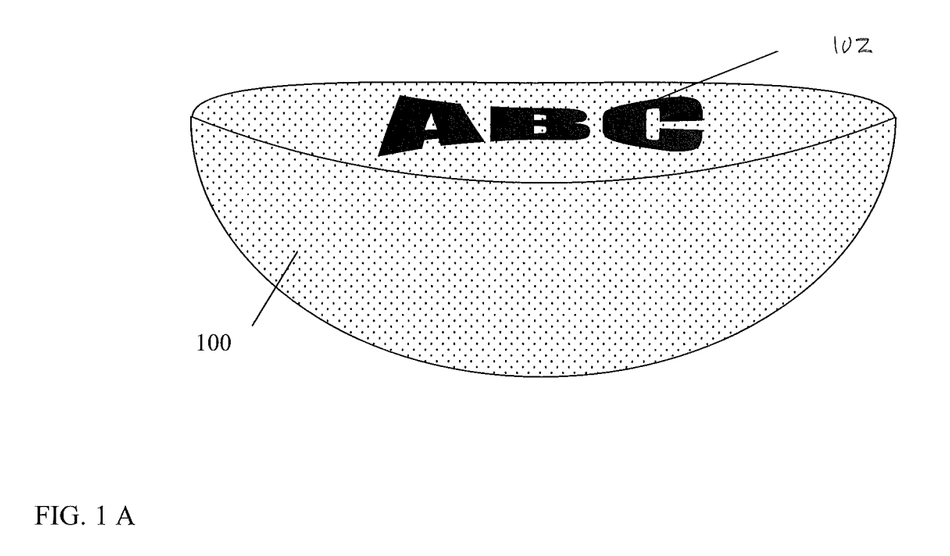
FIG. 1A is a diagrammatic representation of a contact lens incorporating an exemplary inversion marking that is visible in accordance with the present invention.
Figure 1B:
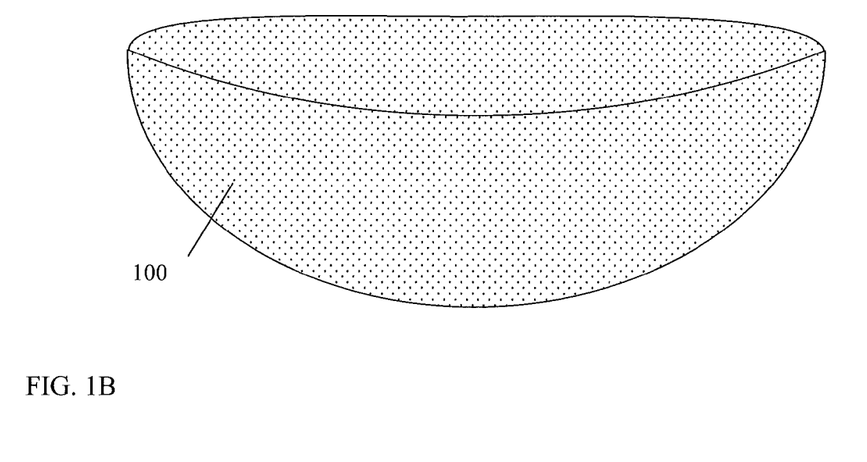
FIG. 1B is a diagrammatic representation of the contact lens of FIG. 1A with the exemplary inversion marking not visible in accordance with the present invention.

FIG. 1A illustrates a contact lens 100 comprising an inversion marking 102 incorporated into a peripheral portion of the contact lens 100. In this exemplary embodiment, the inversion marking 102 simply comprises the letters A, B and C, which would only be visible off the eye, for example, when on the wearer's fingertip or palm. If the letters of the inversion marking 102 appear as illustrated, the contact lens 100 is not inverted and may be placed on the eye. FIG. 1B illustrates the contact lens 100 as it would appear on eye. In other words, the inversion marking 102 (FIG. 1A) is no longer visible.

Figure 2A:
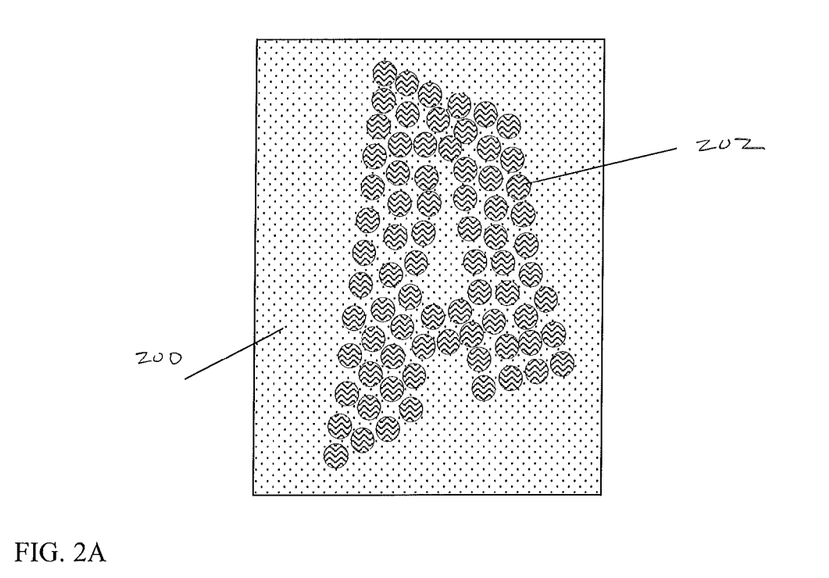
FIG. 2A is a diagrammatic representation of the structure of an exemplary inversion marking comprising liquid crystal droplets in a visible state in a polymer matrix in accordance with the present invention.
Figure 2B:
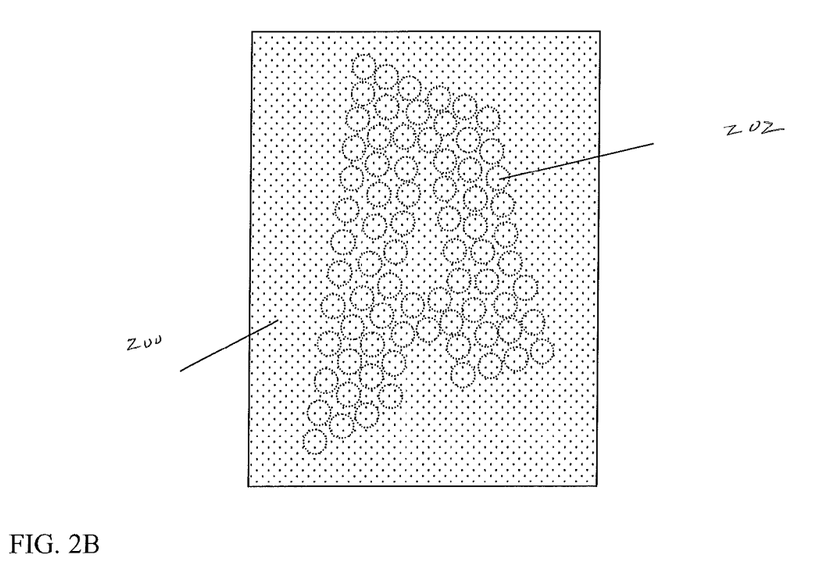
FIG. 2B is a diagrammatic representation of the structure of the exemplary inversion marking of FIG. 2A with the liquid crystal droplets in an isotropic state matching the refractive index of the polymeric matrix making the inversion marking invisible in accordance with the present invention.

In accordance with the present invention, the exemplary inversion marking 102 comprises a layer of polymer dispersed liquid crystal (PDLC) in the form of ABC; however, any suitable pattern or indicia may be utilized so long as a contact lens wearer would recognize the pattern as indicating whether the contact lens 100 is not inverted or inverted. As utilized herein, the form of ABC, or any other indicia, as set forth above shall be construed to mean either that the polymer dispersed liquid crystal and/or any suitable material is physically shaped into an ABC or printed on a material as an ABC. Polymer dispersed liquid crystal materials include liquid crystal micro droplets 202 encapsulated in a polymer matrix as illustrated in FIGS. 2A and 2B to form inversion marking 200. The liquid crystal micro droplets 202 may be arranged to dorm any symbol. In this exemplary embodiment, a thin film on the order of about ten (10) μm in thickness, has two distinct optical states as illustrated in FIG. 2A; namely, strong light scattering which shows a visible letter A with an extinction constant (an extinction constant or the molar extinction coefficient is a measurement of how strongly a material absorbs or scatters light at a given wavelength range) on the order of 1000 $cm^{-1}$ or higher, and transparent with no appreciable attenuation of light propagating therethrough as illustrated in FIG. 2B which shows an invisible letter A. The strong diffuse light scattering is caused by the random orientation of the optical axis of the liquid crystal material in different droplets, the mismatch between the refractive index of the polymer and the liquid crystal material droplets, and/or both.

Figure 3:
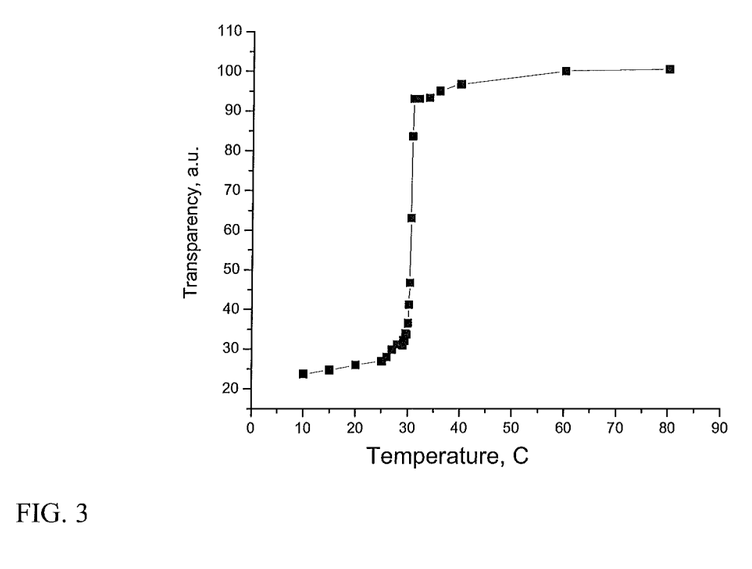
FIG. 3 is a graphical representation of the change in the optical state of a polymer dispersed liquid crystal film as a function of temperature.

FIG. 3 graphically illustrates the exemplary change in the optical state of a polymer dispersed liquid crystal film as a function of temperature. More specifically, FIG. 3 illustrates the change in the optical state of the polymer dispersed liquid crystal film from low transmissive/high light scattering to transparent state as the temperature is increased to near corneal temperature. Essentially, heating the liquid crystal droplets in the polymer matrix to their isotropic state transforms the material into an optically homogenous transparent state, as demonstrated in FIG. 3, if the effective refractive index of the liquid crystal material in the isotropic state matches the refractive index of the polymer.

There are a number of different technologies/methodologies for obtaining polymer dispersed liquid crystal materials thereby providing latitude for incorporating these materials into different contact lens production systems. In accordance with one exemplary embodiment, polymerization-induced phase separation (PIPS) may be utilized to obtain the polymer dispersed liquid crystal material. Polymerization-induced phase separation occurs when a liquid crystal is mixed with a material, for example, a pre-polymer, that has not yet undergone polymerization. Once a homogenous solution is formed, the polymerization reaction is initiated. As the reaction progresses, the liquid crystal molecules start to form droplets. The droplets continue to grow until the polymer binder becomes solid enough that the molecules are trapped and can no longer move. A number of factors influence the size of the liquid crystal droplets in polymerization-induced phase separation, including the curing temperature, which affects the speed of the polymerization as well as the diffusion rate and solubility of the liquid crystal in the polymer, the intensity of the curing light, and the chemical composition of the material utilized. Essentially, these factors can greatly influence the size of the liquid crystal droplets which in turn affects the diffuse light-scattering features of the polymer dispersed liquid crystal.

An exemplary polymerization-induced phase separation process utilized in accordance with the present invention may be described in a number of steps as follows. In a first step, a mixture of forty-five (45) weight percent of nematic liquid crystal E-7 or E7 (manufactured and sold by Merck, Poole, U.K.) and fifty-five (55) weight percent of fresh NOA-65 prepolymer is prepared. Norland Optical Adhesive 65 or NOA-65 is a clear, colorless photopolymer curable by ultraviolet light. In a second step, the mixture is continuously and thoroughly mixed until it becomes optically uniform. In a third step, a cell is filled with the optically uniform mixture and exposed to a UV lamp with a three hundred sixty-five (365) nm wavelength and approximately 10 $mW/cm^2$ light intensity for a period of between thirty (30) seconds and one (1) minute assuming photo polymerization was employed. Polymerization may be performed thermally or by any other suitable method as well. Alternately, polymer dispersed liquid crystal materials may be obtained by solvent evaporation from a mixture of a liquid crystal and a polymer. After curing and cooling down or after solvent evaporation, the samples appear opaque indicating that phase separation has occurred. The polymer may then be peeled off as a free-standing film. In an alternate exemplary embodiment, the mixture may comprise seventy (70) weight percent 5CB and thirty (30) weight percent prepolymer. 5CB or 4-cyano-4'-pentylbiphenyl is another nematic liquid crystal material.

It is important to note that while the wavelength, light intensity and period are specifically set forth for the above described exemplary process, the wavelength, light intensity and the period may be varied for different processes and to achieve different results.

The optical and thermodynamic properties of polymer dispersed liquid crystal materials, including diffusivity, clearing temperature and contrast, may be optimized to meet the goals of a specific application by varying the material parameters, thickness and polymerization conditions. The material parameters comprise the type of the polymer, the liquid crystal material and their ratio in the mixture. Thin films of polymer dispersed liquid crystal materials may be characterized by a clearing temperature higher than standard room temperature and equal to or less than corneal temperature. It is important to note that the optical transmission state of polymer dispersed liquid crystal materials can switch sharply when the temperature changes by less than one (1) degree C. as shown in FIG. 3. Even if the temperature rises smoothly, the change in optical transmission can be very fast, for example, in the millisecond to second range. This feature results from the exponential dependence of optical transmission on the extinction coefficient of the material.

Figure 4:
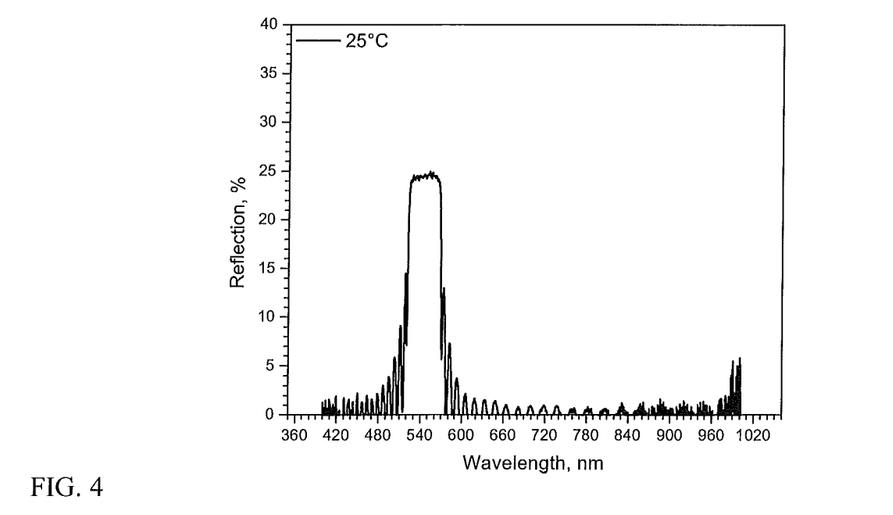
FIG. 4 is a graphical representation of the reflection spectrum of an exemplary cholesteric liquid crystal material for use as an inversion marking in a contact lens centered at green wavelengths in accordance with the present invention.

In an alternate exemplary embodiment of the present invention, the inversion marking of a contact lens may comprise a cholesteric liquid crystal material with a reflection bandgap in the visible range of wavelengths as illustrated in FIG. 4. FIG. 4 shows the reflection spectrum of a cholesteric liquid crystal material which may be utilized as an inversion marking centered at green wavelengths. The cholesteric liquid crystal material can lose its reflection upon heating to a temperature close to the temperature of the cornea due to the reflection bandgap shift to a wavelength range above eight hundred (800) nm or below four hundred (400) nm, which is invisible to the human eye. Since the sensitivity of the eye is higher at green wavelengths as compared to blue and red, the initial, low-temperature green color is preferable for the purposes of the intended application; namely, an inversion marking.

Figure 5:
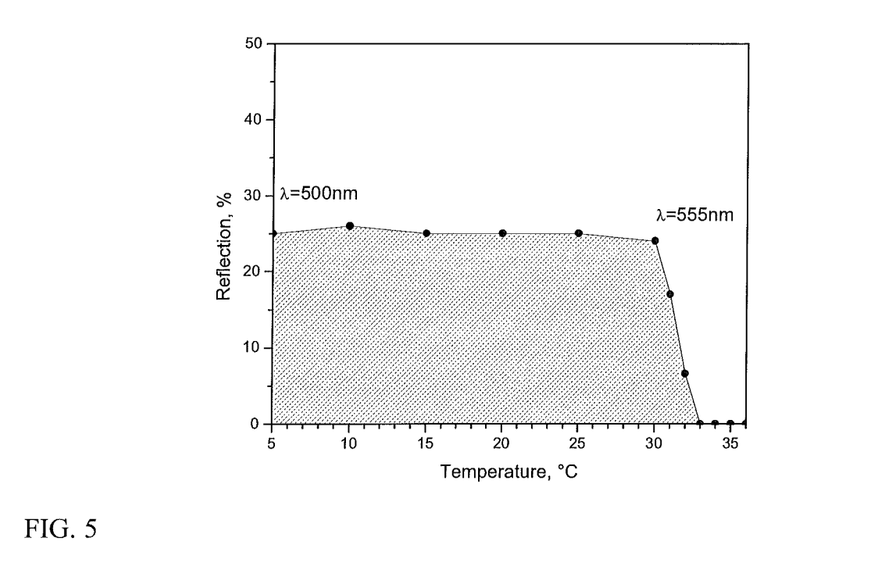
FIG. 5 is a graphical representation of the change in reflection of an exemplary cholesteric liquid crystal material for use as an inversion marking in a contact lens from a reflective state to a transparent state as the temperature increases to near cornea temperature values in accordance with the present invention.

In yet another alternate exemplary embodiment of the present invention, the inversion marking of a contact lens may comprise a cholesteric liquid crystal material that loses its reflection upon heating it to a temperature close to temperature of the cornea due to phase transition of the cholesteric liquid crystal into an isotropic state. The cholesteric liquid crystal mixtures designed for such functionality may be based on these major components; namely, the nematic liquid crystal host, the chiral agent to induce cholesteric liquid crystal structure with visible reflection, and a compound to adjust the clearing temperature to a value near the temperature of the cornea. The cholesteric liquid crystal material properties are preferably chosen or selected such that the material does not exhibit appreciable color change as temperature values below the corneal temperature, but becomes very sensitive and undergoes colored to colorless transition for a small change of temperature near the corneal temperature as illustrated in FIG. 5. FIG. 5 shows the change in the reflection of a cholesteric liquid crystal material utilized for an inversion marking from a reflective state with a five hundred (500) nm Bragg wavelength to a transparent state when the temperature is increased to near cornea temperature values.

In still yet another alternate exemplary embodiment of the present invention, two layers of cholesteric liquid crystal materials of different pitches and resulting reflected colors, for example, red and blue, may be integrated into a lens so that the layer of one pitch is nearest the lens inner surface and the second pitch layer is nearest the lens outer surface so the surfaces are viewed as having different colors. It is important to note that in alternate exemplary embodiments, the cholesteric liquid crystal materials may be on the surfaces of the lens. Color crosstalk between the two pitch layers is prevented by the use of a similarly thin and temperature responsive polymer dispersed liquid crystal material diffuse spacer placed between the two pitch layers. Individual cholesteric liquid crystal layers in this system may be between three (3) to five (5) μm thick to exhibit reflection of spectral components in ambient un-polarized light within the cholesteric liquid crystal reflection band gap with efficiency providing comfortably readable contrast, preferably in the range from about ten (10) to about fifty (50) percent. The polymer dispersed liquid crystal spacer film may be less than ten (10)μm in thickness.

Figure 6:
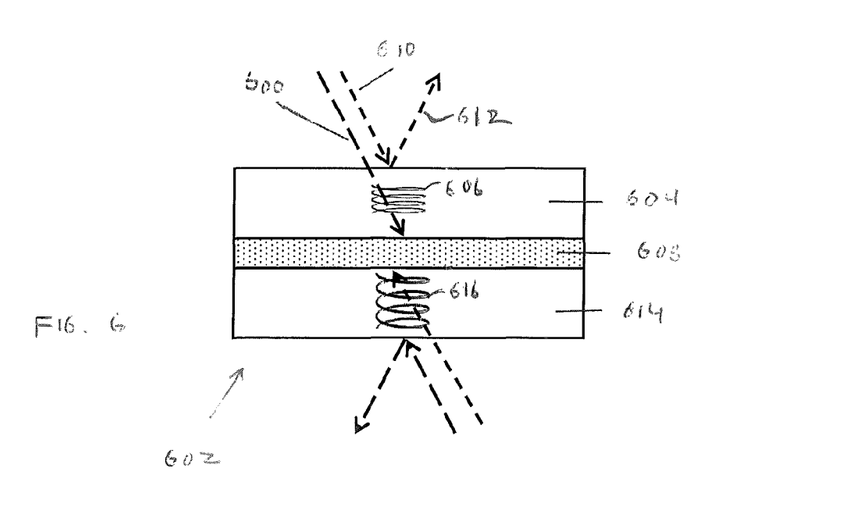
FIG. 6 is a diagrammatic representation of cholesteric liquid crystal droplets in a polymer dispersed liquid crystal material in accordance with the present invention.

Referring now to FIG. 6, there is illustrated a block or layer or marker material 602. More specifically, FIG. 6 illustrates the action of incident light 600 upon the marker material 602. Incident light 600 of a wavelength longer than the red edge of the cholesteric liquid crystal band gap propagates through the cholesteric liquid crystal layer 604 represented by spiral 606 of a short pitch and are blocked due to light scattering in the polymer dispersed liquid material spacer layer 608. The incident light 610 of a shorter wavelength is strongly reflected by the cholesteric liquid crystal layer 604. The reflected light is represented by vector or arrow 612. The second film or layer of cholesteric liquid crystal 614 has a longer pitch, represented by spiral 616, thereby reflecting light of longer wavelength and transmitting a shorter wavelength, the latter being blocked by the polymer dispensed liquid crystal material spacer layer 608. Accordingly, to an observer, light from cholesteric layer 604 would appear blue whereas light from cholesteric liquid layer 614 would appear red.

Figure 7:
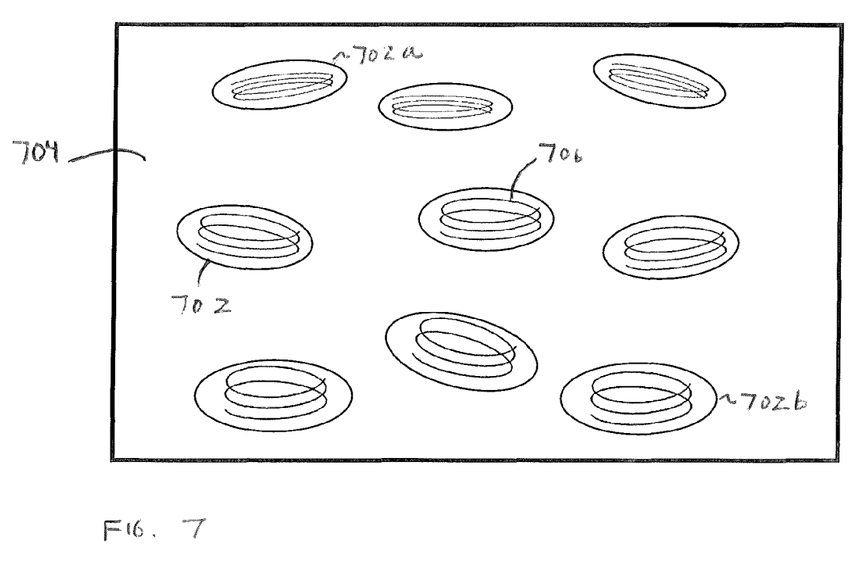
FIG. 7 is a diagrammatic representation of a block of marker material comprising two different cholesteric liquid crystal layers in accordance with the present invention.

In accordance with another aspect, cholesteric liquid crystal droplets may be incorporated into a single polymer matrix with the cholesteric liquid crystal pitch, and resulting reflected color, changing from the front to the back of the resulting film. FIG. 7 generically illustrates cholesteric liquid crystal droplets on a polymer dispersed liquid crystal material. The ovals 702 represent the cholesteric liquid crystal droplets in the polymer 704. Spirals 706 represent cholesteric liquid crystal of different pitch in the droplets 702. The color reflected is directly related to the pitch. The shorter or tighter the pitch, spiral 702a, the shorter the wavelength of reflected light, and the longer the pitch, spiral 702b, the longer the wavelength of reflected light. The front and the back of such a film show different coloration. Crosstalk between the different colors is prevented in such a film by diffuse light scattering at the cholesteric liquid crystal-polymer interfaces and random orientation of cholesteric liquid crystal axes in the droplets.

The pitch gradients may be obtained and stabilized, for example, with the aid of a polymer network or having chiral dopants in the composition of the cholesteric liquid crystal that irreversibly change their helical twisting power. Subjecting such a film to, particularly, UV light results in changing the helical twisting power of the chiral dopants from the front to the back of the film due to light attenuation caused by absorption and scattering. The generation of color gradient film may accompany the photo polymerization process.

The temperature responsive materials described above may be patterned to show numbers, figures or signage that would facilitate identification of the normal orientation of the contact lens. Patterning may be realized using different processes. In a preferred exemplary embodiment, the patterning of a diffuse light scattering polymer dispersed liquid crystal material on a transparent, temperature insensitive background may be realized with UV light propagated through a mask and projected onto the mixture of a monomer and the liquid crystal material. The polymerization process performed at a low temperature such as fifteen (15) degrees C. for the liquid crystal material and polymer composition described above (5CB in NOA-65), under constant nitrogen flow to avoid water vapor condensation, results in forming polymer dispersed liquid crystal in the form of the desired pattern of strong light scattering. In a second step, the temperature of the cell holding the mixture is increased to above twenty-five (25) degrees C., for example, the mask is removed, and the whole sample is subject to the UV light. Thus, all the material that was not subject to light at the first step gets polymerized as a transparent polymer film that remains transparent after cooling independent of ambient temperature. Alternately, as is practiced in photolithography, the unpolymerized portion of the material may be washed out leaving the temperature sensitive pattern intact. This polymer dispersed liquid crystal technology provides the advantage of easy and inexpensive manufacturing, and wide viewing angle due to diffuse light scattering. The cholesteric liquid crystal technology has the advantage of mirror-like reflection that may be visible even at low light conditions, and the feasibility of different colors.

Similar transitions between visible and invisible states may be obtained, as an example, due to the effect of ambient light on photoresponsive liquid crystalline materials. Unlike ambient light, however, the cornea provides a well controlled temperature environment with a mean value at 34.2 degrees C. for a normal person. This is over ten (10) degrees C. higher than room temperature where contact lenses are more likely to be inserted into eye making thermally responsive materials preferable in most situations. Temperature responsive materials are preferable also due to their speed as compared to processes taking place in ambient light.

The present invention is directed to a contact lens comprising an inversion marking layer having a mark that is visible when the lens is off of or out of the eye and becomes invisible when the lens is on the eye. The optical properties of the inversion masking layer, which may include color, light, scattering, light diffraction and light reflection, may be patterned, at least in parts, for easy and unambiguous identification of the normal and inverted states of the contact lens. It is important to note that any suitable pattern may be utilized and that the inversion marking layer, which is incorporated into the contact lens in any suitable location that does not interfere with the optics, may have different optical properties on opposite sides thereof. The transformation from a visible mark to an invisible mark may be induced via a number of factors or processes including by heat from the body to near cornea temperature, by ambient light, and changing humidity as when the contact lens is removed from a storage solution.

Although a number of examples of liquid crystal materials and polymers are set forth herein, it is important to note that any number of materials may be utilized. For example, the inversion marking film may comprise a polymer, a liquid crystal, a dye, a gel, a composite of polymers and liquid crystals in a form of polymer dispersed liquid crystals, a composite of polymers and liquid crystals in the form of polymer networked liquid crystals, a composite of polymers and liquid crystals in the form of polymer-liquid crystals-polymer sequences and composites comprising nanomaterials.

Additionally, certain optical properties of the material forming the inversion marking layer, including refractive index, absorption, optical anisotropy and orientation of optical axis, may be controlled or modulated to achieve various functionality/effects. For example, these properties may be modulated in the spatial scale of three hundred (300) nm to one thousand (1000) nm in any manner including periodically, randomly or any combination thereof. Molecular self-ordering processes as in cholesteric liquid crystals, phase separation processes as in polymer dispersed liquid crystals, optical recording processes as in holographic polymer dispersed liquid crystals, polymer-liquid crystal-polymer slices or polymerization gratings, as well as printing and lithography may be utilized in optical property modulation.

The change between visibility and invisibility of the inversion marking may be precipitated or caused by a number of processes and/or combination of processes, including decreasing the contrast of modulation of the optical properties of the inversion marking layer ultimately leading to an optically homogenous structure and changing of the spatial scale of the modulation of the optical properties of the inversion marking layer to shorter, typically below three hundred (300) nm, or larger wavelengths, typically even eight hundred (800) nm.

The inversion marking layer may comprise a thin film as set forth herein and also include one or more protective layers. The one or more protective layers may themselves be thin films. The inversion marking layer may also comprise functional materials, including photochromic materials and therapeutic agents.

In order to treat infection, inflammation, glaucoma, and other ocular diseases, drugs are often required to be administered to the eye. A conventional method of drug delivery is by topical application to the eye's surface. The eye is uniquely suited to this surface route of drug administration because, properly constituted, drugs can penetrate through the cornea, rise to therapeutic concentration levels inside the eye, and exert their beneficial effects. In practice, eye drops currently account for more than ninety-five (95) percent of drug delivery methods for the eye. Rarely are drugs for the eye administered orally or by injection, either because they reach the eye in too low a concentration to have the desired pharmacological effect, or because their use is complicated by significant systemic side effects.

Eye drops, though effective, are unrefined and inefficient. When an eye drop is instilled in the eye, it typically overfills the conjuctival sac, the pocket between the eye and the eyelids, causing a substantial portion of the drop to be lost due to overflow of the eyelid margin onto the cheek. In addition, a substantial portion of the drop remaining on the ocular surface is washed away by tears into the tear drainage system, thereby diluting the concentration of the drug. Not only is this share of the drug dose lost before it can cross the cornea, but this excess drug may be carried into the nose and throat where it is absorbed into the general circulation, sometimes leading to serious systemic side effects. The small portion of the drug in the eye drop which does penetrate the cornea results in an initial peak tissue concentration, a higher level than is required for the initial pharmacological effect. This tissue concentration then gradually decreases, such that by the time the next eye drop is due, the tissue concentration and the intended pharmacological effect may be too low.

To compound the problems described above, patients often do not use their eye drops as prescribed. Often, this poor compliance is due to an initial stinging or burning sensation caused by the eye drop. Certainly, instilling eye drops in one's own eye can be difficult, in part because of the normal reflex to protect the eye. Older patients may have additional problems instilling drops due to arthritis, unsteadiness, and decreased vision, and pediatric and psychiatric patient populations pose difficulties as well. Accordingly, any number of therapeutic agents for treating any number of conditions may be incorporated into the contact lens, into the inversion marking layer, or both to treat any of these conditions. Properly incorporated agents may elute from the contact lens over a given period of time and with a specific dosage to treat these various conditions.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. An ophthalmic lens, the lens comprising:
a contact lens formed from a first material and including at least an optic zone and a peripheral zone; and
an inversion marking incorporated into the contact lens, the inversion marking comprising a second material configured to be visible when off the eye and invisible when on the eye, the second material being configured to undergo a phase transition process to achieve one of diffuse light scattering and transparent states or reflective and transparent states.

2. The ophthalmic lens according to claim 1, wherein the inversion marking comprises a liquid crystal material.

3. The ophthalmic lens according to claim 2, wherein the liquid crystal material is incorporated into the peripheral zone of the contact lens.

4. The ophthalmic lens according to claim 3, wherein the liquid crystal material is patterned for identification of the normal and inverted state of the contact lens.

5. The ophthalmic lens according to claim 2, wherein the liquid crystal material is configured as a thin film.

6. The ophthalmic lens according to claim 2, wherein the liquid crystal material comprises a nematic liquid crystal material.

7. The ophthalmic lens according to claim 6, wherein the nematic liquid crystal material is configured such that a transformation can be induced between a diffuse light scattering state and a transparent state by the application of at least one of a temperature change, a light change and humidity change.

8. The ophthalmic lens according to claim 2, wherein the liquid crystal material comprises a cholesteric liquid crystal material.

9. The ophthalmic lens according to claim 8, wherein the cholesteric liquid crystal material is configured such that a transformation can be induced between a reflective state and a transparent state by the application of at least one of a temperature change, a light change and humidity change.

10. The ophthalmic lens according to claim 2, wherein the liquid crystal material comprises at least one of a nematic liquid crystal material, a cholesteric liquid crystal material, a polymeric material or a combination thereof.

11. The ophthalmic lens according to claim 1, further comprising at least one therapeutic agent incorporated into at least one of the contact lens, the inversion marking or both the contact lens and the inversion marking.

12. A lens comprising a first material, and a marking formed from a second material incorporated into the first material, the second material being configured to undergo a transformation between a visible state and an invisible state by the application of at least one of a temperature change, a light change or a humidity change, the second material being configured to undergo a phase transition process to achieve one of diffuse light scattering and transparent states or reflective and transparent states.

13. The lens according to claim 12, wherein the lens comprises an ophthalmic lens.

14. The lens according to claim 13, wherein the ophthalmic lens comprises a contact lens.

* * * * *